Aug. 22, 1933.  F. C. LAVARACK  1,923,939
JUNCTION BOX
Filed Aug. 19, 1931  2 Sheets-Sheet 1
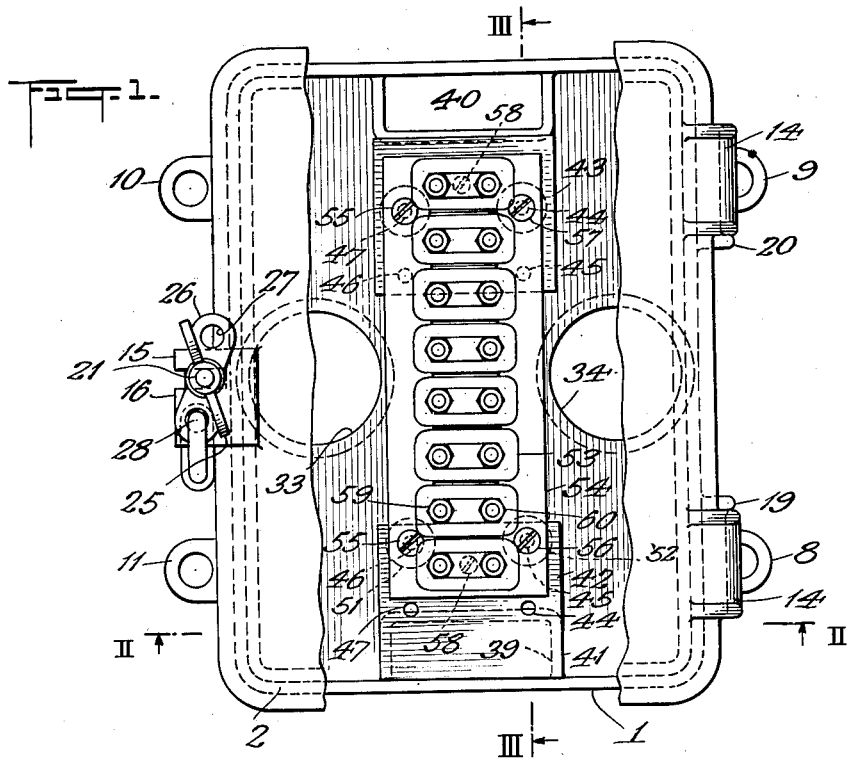
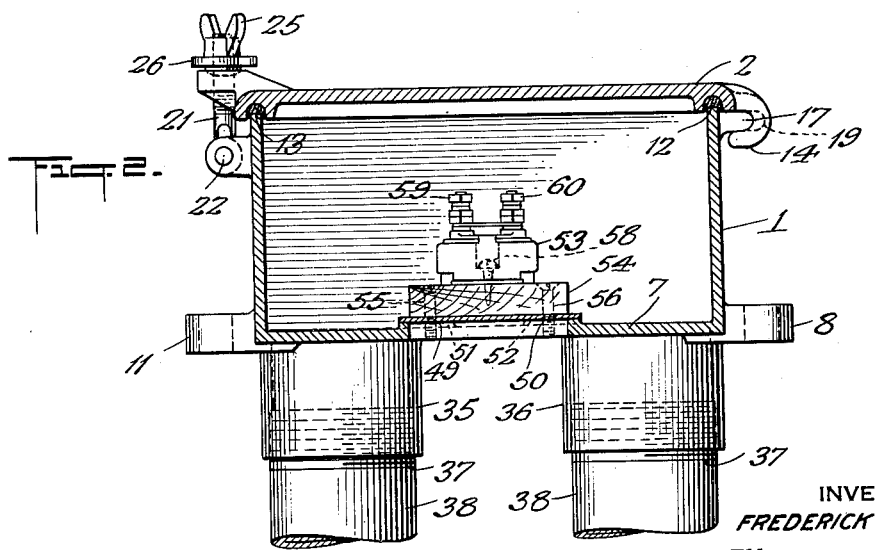
INVENTOR
FREDERICK C. LAVARACK.
BY
Lyman E. Dodge
ATTORNEY Aug. 22, 1933.  F. C. LAVARACK  1,923,939
JUNCTION BOX
Filed Aug. 19, 1931   2 Sheets-Sheet 2
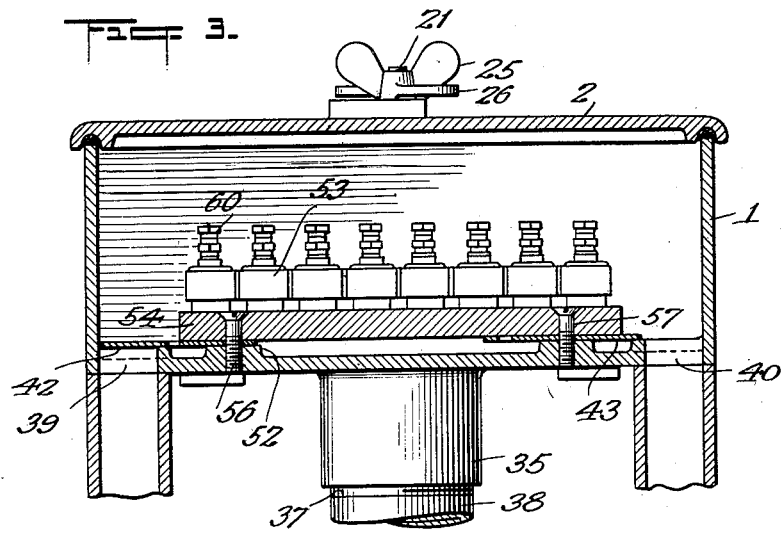
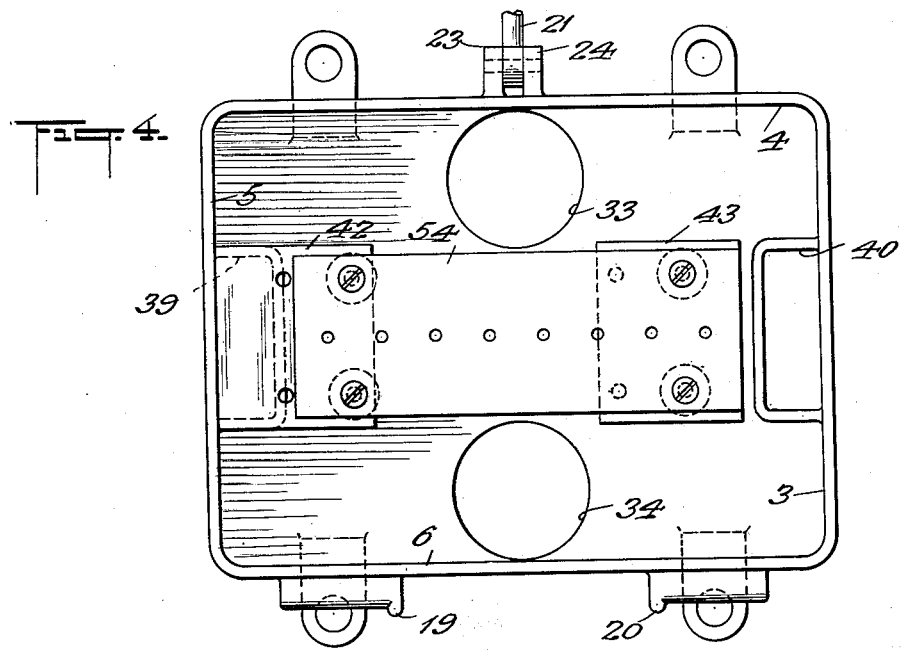
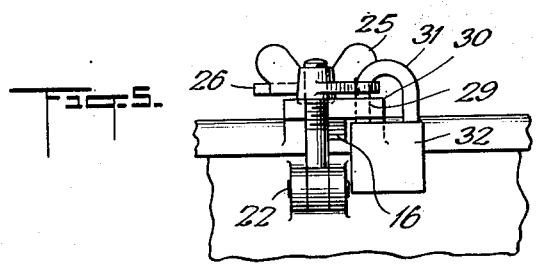
INVENTOR
FREDERICK C. LAVARACK.
BY
Lyman E. Dodge
ATTORNEY Patented Aug. 22, 1933

1,923,939

UNITED STATES PATENT OFFICE 1,923,939

JUNCTION BOX

Frederick C. Lavarack, Montclair, N. J., assignor to Railroad Accessories Corporation, New York, N. Y., a Corporation of New York Application August 19, 1931. Serial No. 557,986

1 Claim. (Cl. 247—1)

This invention relates to electrical apparatus, especially, electrical conduits and, more particularly, a junction box for use with conduits.

A principal object of this invention is to provide a junction box so constructed and arranged that openings therein may or may not be availed of, for the purpose of leading wires into the box, in accordance with the wish of the user.

A further object of the invention is to provide a junction box, including means for supporting terminal blocks therein, so arranged that these means may also serve to position and support an adjustable conduit entrance cover.

A further object of the invention is to provide a junction box, of the type provided with a cover which in normal use is entirely removed from connection with the box when work is to be done within the box, which is provided with means for guiding a cover into proper position.

Other objects and advantages will appear as the description of the particular embodiment selected to illustrate the invention progresses, and the novel features will be particularly pointed out in the appended claim.

In describing the invention in detail and the particular physical embodiments selected to illustrate the invention, reference will be had to the accompanying drawings and the several views therein, in which like characters of reference designate like parts throughout the several views, and in which:

Figure 1 is a top plan view, with parts of the cover broken away, of a junction box embodying my invention; Fig. 2, a sectional view of the device as shown by Fig. 1 on the plane indicated by the line II—II, viewed in the direction of the arrows at the ends of the line; Fig. 3, a cross-sectional view of the device as shown by Fig. 1 on the plane indicated by the line III—III, viewed in the direction of the arrows at the ends of the line; Fig. 4, a top plan view, with the cover removed, of a junction box embodying my invention, as shown by Fig. 1; Fig. 5, a fragmentary front elevational view illustrating a preferred construction of lock for the cover of the junction box shown in Fig. 1.

The junction box of my invention includes a main body portion, designated as a whole by 1, and a cover, designated as a whole by 2.

The main body portion 1 of my box is preferably substantially rectangular in form, as best shown by Figs. 1 and 4. The side walls 3, 4, 5 and 6 each extend at a right angle from the end or bottom wall 7, and are of a height sufficient to properly receive such electrical instruments as may be desired to place in the box.

For the purpose of attaching the junction box to a suitable support, apertured lugs 8, 9, 10 and 11 are provided. The aperture in each of these lugs provides a way by which a screw or bolt may be used to attach the box to a suitable support.

The cover 2 of the box is provided with a gasket groove 12 within which is the gasket 13. This groove and gasket extend inwardly around the top edge of the side walls.

In order to securely fasten the cover 2 to the box, the cover is provided at one edge with outstanding inwardly curved lug engaging members, as 14. On the other edge the cover is provided with spaced eye bolt receiving lugs 15 and 16. In order to secure the cover 2 upon the box, the inwardly curved lug engaging members, as 14, are engaged with the lugs, as 17. In order that the engagement shall be such that the cover will be correctly positioned, the lugs 17 are provided with directing ribs 19 and 20, as best shown in Fig. 1. Rib 20 prevents the cover from moving too far in one direction, and rib 19 prevents it from moving too far in the other direction so that between the two the cover, through the inwardly curved lug engaging members, as 14, is accurately positioned and directed to its proper position.

With the cover 2 properly in place the eye bolt 21, pivoting on the pin 22 held by the lugs 23 and 24, is moved up into the position as shown in Fig. 2, and the wing nut 25 is screwed down in place thereon so that it bears firmly against the lugs 15 and 16 and so forces the cover down into place, whereby gasket 13 bears tightly against the top edges of the side walls. The wing nut 25 is provided with the horizontal extension 26 which is orificed at 27 and 28. When one of the orifices 27 or 28 is over an orifice, as 29, in an extension 30 of lug 16, the yoke 31 of a padlock 32 may be passed through the orifice 29 and one of the orifices 27 or 28 and so lock the cover in place.

The bottom or end wall 7 is provided with orifices 33 and 34, as best shown in Fig. 1. Underneath or on the other side of the end or bottom wall 7 are hollow or circular bosses 35 and 36. These bosses are internally threaded, as at 37, for the reception of the threaded ends of conduit, as 38. Through this conduit, wires may be carried to the interior of the box.

At each end of the box, as best shown in Fig. 1, are provided rectangular orifices 39 and 40.

These orifices 39 and 40 are each surrounded on three sides by a very low wall, as 41. These orifices 39 and 40 are adapted to cooperate with the ordinary and well known wooden trunking such as is largely used in railway signalling, so that I prefer to designate the orifices 39 and 40, as trunking orifices.

At times, neither of the orifices 39 and 40 will be needed, and at other times, one, only, of the orifices will be needed. It is very desirable, however, that if an orifice is not being used, that is, is not connected to a conduit, it should be covered so as to prevent the entrance of insects or other undesired things into the box. To this end, I have provided orifice covering plates 42 and 43. Each plate is provided with four orifices, as 44, 45, 46 and 47. The orifices, as 45 and 46, are spaced apart so as to align with threaded orifices, as 49 and 50, in the bosses, as 51 and 52, so that threaded screws may be passed through each of the orifices, as 45 and 46, and threaded into the orifices as 49 and 50 in the bosses, as 51 and 52, thereby holding the trunking orifice plate, as 42, in place. When the screws pass through the orifices, as 45 and 46, the plate 42 is over the orifice, as 39, but if it is desired to use an orifice, as 39 or 40, then the corresponding plate is moved endwise to the position as shown in connection with orifice 40 wherein the orifices, as 44 and 47, are positioned over the orifices, as 49 and 50, so that when screws are passed through the orifices, as 44 and 47, a cover plate, as 42, will be held in place but not closing the orifice with which it is associated.

As applicant desires to mount junction blocks, as 53, within the box 1, the block 54 is preferably first mounted within the box 1. This is best done by passing headed screws, as 55 and 56, through bores in the four corners thereof into the bosses, as 51 and 52. These screws serve not only to hold the block 54 in place but serve also to hold the plates, as 42 and 43, in place, as they may be passed through the orifices, as 44, 45, 46 and 47, of the plates, as 42. Two of these screws are designated 55 and 56 in Fig. 2 and another is designated 57 in Fig. 3.

The block 54 being made of suitable material, terminal blocks as 53 may be secured thereto by an ordinary wood screw as 58.

My improved junction box is adapted to receive wires through a conduit, as 38. These may be connected to a binding post, as 59, and thus connect with wires passing out through the other conduit connected to a binding post, as 60. The box is also adapted to receive wires through either of trunking openings, 39 or 40, and which after being connected to a junction block may pass out through either 40 or 39, or through either the orifice 33 or 34 connecting with the conduits.

In many devices similar to that of applicant's there are orifices such, as 39 and 40, covered by what is known as a "knock-out" portion. Applicant's construction provides all of the facilities of a "knock-out" portion with added advantages. Applicant's box has orifices, as 39 and 40, which may be used or not used. If they are used they are uncovered. If they are not used they are covered. If at one time, it is desired to use one of the orifices it may be used by withdrawing the cover. If at another time one has no desire to use that orifice it may be covered. The cover is always there, unlike the ordinary knock-out box, the portion knocked out is thrown away, and even if not thrown away cannot be successfully used to cover the opening made.

Although applicant has described one particular physical embodiment of his invention and explained the principle and mode of operation thereof, nevertheless, he desires to have it understood that the form selected is merely illustrative, but does not exhaust the possible physical embodiments underlying his invention.

What I claim as new and desire to secure by Letters Patent of the United States, is:

A junction box formed with a bottom wall, four side walls, and a removable cover, said bottom wall formed with an orifice and a boss formed with a threaded recess; a plate formed with two spaced orifices; a block adapted to support electrical devices and formed with a bore for the reception of a headed screw whereby the headed screw passing through the block and into the threaded recess holds the block in place and passing through one or the other of the orifices in the plate holds the plate, alternatively, either so as to cover or not cover the orifice.

FREDERICK C. LAVARACK.